(12) United States Patent
Soubra et al.

(10) Patent No.: US 9,109,889 B2
(45) Date of Patent: Aug. 18, 2015

(54) DETERMINING TILT ANGLE AND TILT DIRECTION USING IMAGE PROCESSING

(75) Inventors: Omar Pierre Soubra, Westminster, CO (US); Martin Holgren, Boulder, CO (US); James M Janky, Los Altos, CA (US)

(73) Assignee: Trimble Navigation Limited, Westminster, CO (US)

( * ) Notice: Subject to any disclaimer, the term of this patent is extended or adjusted under 35 U.S.C. 154(b) by 783 days.

(21) Appl. No.: 13/397,445

(22) Filed: Feb. 15, 2012

(65) Prior Publication Data

US 2012/0330601 A1   Dec. 27, 2012

Related U.S. Application Data

(63) Continuation-in-part of application No. 13/167,733, filed on Jun. 24, 2011, now Pat. No. 8,754,805.

(51) Int. Cl.
*G01C 1/00* (2006.01)
*G01C 15/00* (2006.01)
*G01C 15/06* (2006.01)
(Continued)

(52) U.S. Cl.
CPC ............... *G01C 15/00* (2013.01); *G01C 15/06* (2013.01); *G01S 1/725* (2013.01); *G01S 19/48* (2013.01); *G01S 19/51* (2013.01); *G01S 19/53* (2013.01); *G06K 9/00664* (2013.01);
(Continued)

(58) Field of Classification Search
CPC ........ G01C 15/06; G01C 15/00; G01C 21/12; G01C 9/06; G01S 19/48; G01S 19/51; G01S 19/53; G01S 1/725; G06K 9/00664; G06T 2207/30204; G06T 2207/30244; G06T 7/0042
See application file for complete search history.

(56) References Cited

U.S. PATENT DOCUMENTS

| 5,642,285 A | 6/1997 | Woo |
| 6,147,598 A | 11/2000 | Murphy |

(Continued)

FOREIGN PATENT DOCUMENTS

| EP | 1931945 | 6/2008 |
| EP | 1936323 A2 | 6/2008 |

(Continued)

OTHER PUBLICATIONS

Chapman et al., "Monocular SLAM—Alternative Navigation for GPS-Denied Areas," GPS World; Sep. 2008, pp. 42-49.

(Continued)

*Primary Examiner* — Elias Desta
(74) *Attorney, Agent, or Firm* — Kilpatrick Townsend & Stockton LLP

(57) ABSTRACT

A survey instrument includes a surveying device configured to perform survey measurements and an imaging device coupled to the surveying device and having a known spatial relationship with the surveying device. The imaging device may be configured to obtain image information. The survey instrument also includes a processor in electrical communication with the imaging device. The processor may be configured to receive the image information from the imaging device, process the image information to determine a pose of the imaging device, and determine a tilt angle of the survey instrument and a tilt direction of the survey instrument in a reference frame. Tilt angle and the tilt direction of the survey instrument may be determined using the pose of the imaging device.

37 Claims, 15 Drawing Sheets

(51) Int. Cl.
  *G01S 19/51* (2010.01)
  *G06K 9/00* (2006.01)
  *G01S 19/48* (2010.01)
  *G01S 19/53* (2010.01)
  *G01S 1/72* (2006.01)
  *G06T 7/00* (2006.01)

(52) U.S. Cl.
  CPC .... *G06T 7/0042* (2013.01); *G06T 2207/30204* (2013.01); *G06T 2207/30244* (2013.01)

(56) References Cited

U.S. PATENT DOCUMENTS

| | | | |
|---|---|---|---|
| 6,282,362 | B1 | 8/2001 | Murphy |
| 7,248,285 | B2 | 7/2007 | Needham |
| 7,339,611 | B2 | 3/2008 | Marold |
| 7,526,384 | B2 | 4/2009 | MacIntosh et al. |
| 7,541,974 | B2 | 6/2009 | Scherzinger |
| 7,619,561 | B2 | 11/2009 | Scherzinger |
| 7,650,013 | B2 | 1/2010 | Dietsch et al. |
| 7,697,127 | B2 | 4/2010 | Vogel |
| 7,719,467 | B2 | 5/2010 | Norda |
| 8,351,686 | B2 * | 1/2013 | Graesser ............ 382/154 |
| 2003/0083804 | A1 | 5/2003 | Pilley et al. |
| 2004/0168148 | A1 | 8/2004 | Goncalves et al. |
| 2005/0125142 | A1 | 6/2005 | Yamane |
| 2005/0209815 | A1 | 9/2005 | Russon et al. |
| 2006/0125691 | A1 | 6/2006 | Menache et al. |
| 2008/0285805 | A1 | 11/2008 | Luinge et al. |
| 2009/0024325 | A1 * | 1/2009 | Scherzinger ............ 702/5 |
| 2009/0093959 | A1 | 4/2009 | Scherzinger et al. |
| 2009/0262974 | A1 | 10/2009 | Lithopoulos |
| 2010/0063733 | A1 | 3/2010 | Yunck |
| 2010/0141759 | A1 | 6/2010 | Scherzinger |
| 2010/0172546 | A1 | 7/2010 | Sharp |
| 2010/0174507 | A1 | 7/2010 | Vogel |
| 2011/0007939 | A1 | 1/2011 | Teng et al. |
| 2012/0163656 | A1 | 6/2012 | Wang et al. |

FOREIGN PATENT DOCUMENTS

| | | |
|---|---|---|
| EP | 1944572 A1 | 7/2008 |
| EP | 2240740 | 10/2010 |
| WO | 2009/100773 A1 | 8/2009 |
| WO | 2009/100774 A1 | 8/2009 |
| WO | 2009/103342 A1 | 8/2009 |
| WO | 2009/106141 A1 | 9/2009 |
| WO | 2010/080950 A1 | 7/2010 |

OTHER PUBLICATIONS

Kohler et al., "TrackSense: Infrastructure Free Precise Indoor Positioning Using Projected Patterns," A. LaMarca et al. (Eds.) Pervasive 2007, LNCS 4480, pp. 334-350, Springer-Verlag Berlin Heiderlberg.
Lemaire et al., "Vision-Based SLAM: Stereo and Monocular Approaches," International Journal of Computer Vision 74 (3), pp. 343-364, Springer Science + Business Media, LLC (2007).
Notice of Allowance of Feb. 6, 2014 for U.S. Appl. No. 13/167,733, 6 pages.
Non-Final Office Action of Oct. 8, 2013 for U.S. Appl. No. 13/167,733, 15 pages.

* cited by examiner

View from Left of Cube
(facing North)

View from Above Cube

CAHV Reference Frame
(H extends along horizontal axis;
V extends downward along vertical axis;
and A extends inward along lens axis)

X'Y'Z' Reference Frame
(X'Y' lie along image plane and
Z' extends outward along lens axis)

US 9,109,889 B2

DETERMINING TILT ANGLE AND TILT DIRECTION USING IMAGE PROCESSING

CROSS-REFERENCES TO RELATED APPLICATIONS

The present application is a continuation-in-part of U.S. patent application Ser. No. 13/167,733, filed Jun. 24, 2011, the disclosure of which is incorporated herein by reference in its entirety for all purposes.

FIELD OF THE INVENTION

Embodiments of the present invention relate generally to methods and instruments for determining tilt angle and tilt direction using image processing techniques. The methods and instruments may be used in survey applications such as determining locations of points.

BACKGROUND

Controlling tilt of a survey instrument is a major activity for a surveyor. A great deal of time and effort is devoted to insuring that a survey instrument is leveled. Conventional methods of leveling a survey instrument involve aligning the survey instrument with a local gravity vector using a bubble level. Typical survey procedures involve leveling a survey instrument before performing measurements so that data is nearly free of tilt errors.

Today's survey instruments often comprise an optical system and a Global Navigation Satellite System (GNSS), otherwise referred to a Global Positioning System (GPS). A conventional GNSS survey instrument typically includes a location measurement device coupled to an end of a surveyor's pole, whereas a conventional optical survey instrument (e.g., optical total station) typically uses a tripod support system. The GNSS type of survey instrument is used to determine locations of points of interest that are typically located on the ground when many data points are desired, owing to its ease of portability. A bottom or tip of the surveyor's pole is placed at the point of interest, held in a vertical position as indicated by the bubble level, and a location measurement is obtained. Leveling ensures that a measurement center (e.g., the antenna phase center) of the location measurement device is as close to directly above the point of interest as possible. This is important because error is introduced if the measurement center is not directly above the point of interest. For example, a surveyor's pole that is two-meters long and is tilted two degrees from vertical can result in as much as two centimeters of measurement error. That is, the measurement center of the location measurement device may be as much as two centimeters to one side of the point of interest.

If the time required to level a survey instrument could be reduced or eliminated, a surveyor could be more productive by taking more measurements during a given time period. Thus, improved methods and instruments are continually desired to reduce the time and effort required to level a survey instrument. This applies to GNSS survey instruments, optical survey instruments, handheld survey instruments, and any other type of survey instrument that utilizes leveling processes.

SUMMARY

Embodiments of the present invention provide improved methods and instruments for determining tilt angle and tilt direction of a survey instrument using image processing techniques. The tilt angle and tilt direction may be used in survey applications to determine locations of points. For example, in some embodiments a pose of an imaging device that is coupled to a surveying instrument is determined using match-move image processing techniques. As used herein, match-move refers broadly to software applications that can be used to extract information (such as camera pose) from one or more images. The pose of the imaging device can be used to determine a tilt angle and a tilt direction of the survey instrument. Further, the survey instrument may include a location measurement device, and a measured location may be used with the tilt angle and tilt direction to determine a location of a point of interest (e.g., a point at a tip of a surveyor's pole, a point identified using a laser pointer of a handheld survey instrument, or the like). Details of these and other embodiments are described below.

In accordance with an embodiment of the present invention, a survey instrument includes a support pole having a first end and a second end and a GNSS receiver coupled to the first end of the support pole and having a known spatial relationship with the second end of the support pole. The GNSS receiver may be configured to determine a location of an antenna phase center of the GNSS receiver in a reference frame. The survey instrument also includes an imaging device coupled to the support pole. The imaging device may be configured to obtain image information. The survey instrument also includes a processor in electrical communication with the GNSS receiver and the imaging device. The processor may be configured to receive the location of the antenna phase center from the GNSS receiver, receive the image information from the imaging device, determine a pose of the imaging device using the image information, and determine a tilt angle of the support pole and a tilt direction of the support pole in the reference frame. The tilt angle and the tilt direction of the support pole may be determined using the pose of the imaging device. The processor may also be configured to determine a location of the second end of the support pole in the reference frame. The location may be determined using the location of the antenna phase center of the GNSS receiver and the tilt angle and the tilt direction of the support pole.

In an embodiment, the image information includes a first image captured at a first location with the support pole substantially parallel to a local gravity vector and a second image captured at a second location. The pose of the imaging device may be determined based on features in the first image compared to the features in the second image.

In another embodiment, the tilt angle of the support pole is determined with reference to a local gravity vector.

In another embodiment, the image information includes a plurality of images each capturing features that are common with another one of the plurality of images. At least one of the plurality of images may be captured while the support pole is substantially parallel to a local gravity vector. The processor may be configured to process the image information using correspondences between the plurality of images.

In another embodiment, the processor is configured to process the image information using a feature-identification process. The image information may include at least one image capturing features having known locations in the reference frame.

In another embodiment, the imaging device and the antenna phase center of the GNSS receiver are arranged in a known spatial relationship.

In yet another embodiment, an entrance pupil of the imaging device is substantially coaxial with the antenna phase center of the GNSS receiver and the second end of the support pole.

In accordance with another embodiment of the present invention, a survey instrument includes a surveying device configured to perform survey measurements and an imaging device coupled to the surveying device and having a known spatial relationship with the surveying device. The imaging device may be configured to obtain image information. The survey instrument also includes a processor in electrical communication with the imaging device. The processor may be configured to receive the image information from the imaging device, process the image information to determine a pose of the imaging device, and to determine a tilt angle of the survey instrument and a tilt direction of the survey instrument in a reference frame. The tilt angle and tilt direction of the survey instrument may be determined using the pose of the imaging device.

In an embodiment, the image information includes at least one image and the pose of the imaging device is determined based on features in the image having known locations in the reference frame.

In another embodiment, the processor is disposed within a handheld device that is separate from the surveying device and the imaging device. The image information may be received from the imaging device using a wireless communications link.

In another embodiment, the surveying device comprises a GNSS receiver and the survey measurements performed by the surveying device include location measurements.

In another embodiment, the survey instrument also includes a support pole. A first end of the support pole may be coupled to the surveying device and a second end of the support pole may be configured to be placed at a point of interest. In some embodiments, the imaging device may be coupled to the support pole and have a known spatial relationship with the second end of the support pole. The processor may be further configured to process the image information to determine a location of the imaging device in the reference frame, and configured to determine a location of the second end of the support pole in the reference frame using the location of the imaging device, the tilt angle and the tilt direction of the survey instrument, and the known spatial relationship between the imaging device and the second end of the support pole. In other embodiments, the surveying device may be coupled to a first end of the support pole and comprise a GNSS receiver configured to determine location information. The GNSS receiver may have a known spatial relationship with the second end of the support pole. The processor may be further configured to determine a location of the second end of the support pole using the location information from the GNSS receiver, the tilt angle and the tilt direction of the survey instrument, and the known spatial relationship between the GNSS receiver and the second end of the support pole.

In another embodiment, the imaging device and the surveying device are arranged in a known spatial relationship.

In another embodiment, the survey measurements performed by the surveying device include location measurements corresponding to a measurement center of the surveying device. An entrance pupil of the imaging device may be substantially coaxial with the measurement center of the surveying device and first and second ends of the support pole.

In another embodiment, the surveying device comprises an optical survey instrument configured to perform optical survey measurements and a distance measuring device configured to determine a distance to a point of interest. The survey instrument may further comprise a tripod support coupled to the surveying device and the imaging device. The surveying device may comprise a GNSS receiver configured to determine location information, and the processor may be further configured to determine a location of the point of interest using the location information, the optical survey measurements, the distance, and the tilt angle and the tilt direction of the survey instrument.

In yet another embodiment, the surveying device and the imaging device are integrated within a handheld device. The handheld device may comprise a laser pointer for aligning the handheld device with a point of interest and a distance measurement device for determining a distance to the point of interest. The survey measurements performed by the surveying device may include location information. The processor may be further configured to determine a location of the point of interest using the location information, the tilt angle and the tilt direction of the survey instrument, and the distance to the point of interest. In some embodiments, the distance measurement device determines the distance to the point of interest using sonic measurements. In other embodiments, the distance measurement device is an electronic distance measurement (EDM) device. In yet other embodiments, the distance measurement device uses the laser to determine the distance to the point of interest.

In accordance with another embodiment of the present invention, a method of determining a location of a point of interest using a survey instrument includes receiving a location of an antenna phase center from a GNSS receiver, receiving image information from an imaging device, determining a pose of the imaging device using the image information, and determining a tilt angle of the survey instrument and a tilt direction of the survey instrument in a reference frame. The tilt angle and the tilt direction of the survey instrument may be determined using the pose of the imaging device. The method also includes determining the location of the point of interest using the location of the antenna phase center and the tilt angle and the tilt direction of the survey instrument.

In an embodiment, the method also includes providing a user indication to obtain additional image information. The user indication may be activated based on at least one of (1) a distance from a reference measurement station, (2) a number of correspondences between images compared to a threshold, or (3) an error in the pose of the imaging device compared to a threshold.

In accordance with yet another embodiment of the present invention, a method of determining a tilt angle and a tilt direction of a survey instrument includes aligning the survey instrument with a local gravity vector at a first station and acquiring a first image at the first station using an imaging device. The first image may capture a plurality of features. The method also includes positioning the survey instrument at a second station different from the first station and acquiring a second image at the second station using the imaging device. The second image may capture at least a portion of the plurality of features captured in the first image. The method also includes processing the first image and the second image to determine a pose of the imaging device at the second station and determining the tilt angle and the tilt direction of the survey instrument at the second station. The tilt angle and the tilt direction may be determined using the pose of the imaging device.

In an embodiment, the method also includes, determining a location of the survey instrument in the reference frame at the second station and determining a location of a point of interest using the tilt angle and the tilt direction of the survey instrument at the second station and the location of the survey instrument at the second station.

In another embodiment, the method also includes providing a user indication that the tilt angle at the second station is greater than a threshold tilt angle.

Numerous benefits are achieved using embodiments of the present invention over conventional techniques. For example, some embodiments provide methods for determining a tilt angle and tilt direction of a survey instrument using a pose of an imaging device. Since pose can be determined, survey measurements can be performed using an un-leveled survey instrument. Performing measurements using an un-leveled survey instrument can increase measurement efficiency by reducing the time and effort that is normally required to level the survey instrument. The increased efficiency can reduce measurement time and lower measurements costs. Depending on the embodiment, one or more of these benefits may exist. These and other benefits are described throughout the specification and more particularly below.

BRIEF DESCRIPTION OF THE DRAWINGS

FIGS. 1A-1C are simplified diagrams illustrating a method of determining a pose of an imaging device that may be used to determine a tilt angle and tilt direction of a survey instrument in accordance with an embodiment of the invention;

DETAILED DESCRIPTION

Embodiments of the present invention provide improved methods and instruments for determining tilt angle and tilt direction using image processing techniques. As used herein, tilt angle refers to an angle between a real-world vertical axis (e.g., a local gravity vector) and a vertical axis of an imaging device. Tilt direction refers to orientation (or rotation about the vertical axis) relative to a reference such as true north, magnetic north, or any other reference. The image processing techniques may involve using one or more matchmove techniques to determine a pose of an imaging device. The pose may include a location and rotation of the imaging device relative to a reference. In some embodiments, the reference is provided by features in an image where the features are at known locations in a reference frame. In other embodiments, the reference is provided by correspondences between features in images where at least one of the images is acquired with the imaging device in a known (e.g., leveled) position. The pose of the imaging device can be used to determine a tilt angle and tilt direction of the survey instrument to which the imaging device is coupled. The tilt angle and tilt direction can be used with a measured location of a survey instrument to determine a location of a point of interest. As an example, in some embodiments the survey instrument may include a support pole (e.g., a surveyor's pole), and the tilt angle and tilt direction may be used to determine the location of a point at a tip of the support pole.

As used herein, pose refers to exterior (or extrinsic) orientation of an imaging device. This is the orientation of the imaging device with respect to surrounding objects in a field of view. The orientation is generally defined by a rotation matrix R and a translation vector V that relate a coordinate system of the imaging device with a real-world coordinate system. The process of determining pose may be referred to as extrinsic calibration. This is in contrast to intrinsic calibration, that may be used to determine internal parameters such as focal length, image aspect ratio, effective number of pixels, principal point, and the like.

Determining Pose Using Features at Known Locations

Figure 1B:
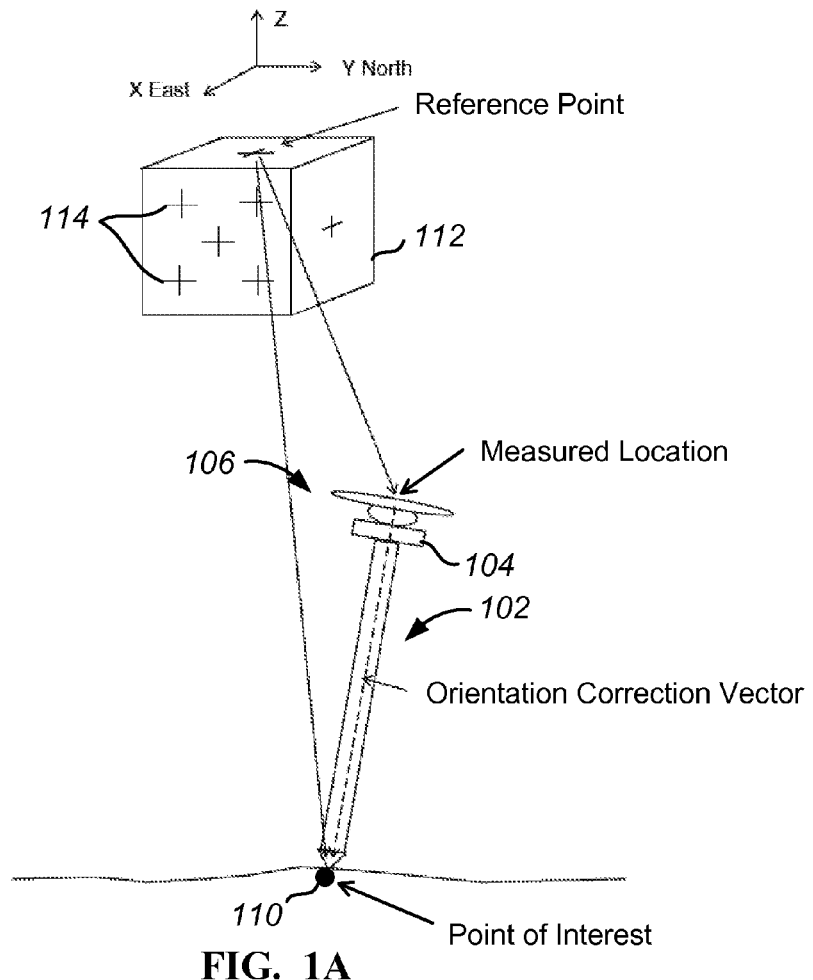
Figure 1B:
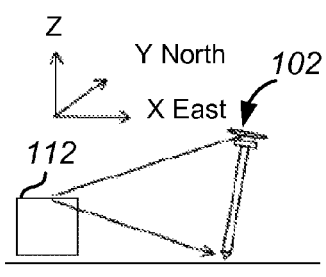
Figure 1C:
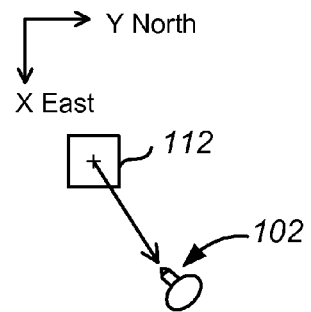

FIGS. 1A-1C are simplified diagrams illustrating a method of determining a pose of an imaging device. The pose may be used to determine tilt angle and tilt direction of a survey instrument in accordance with an embodiment of the invention. In this example, the pose is determined using features in an image where the features (i.e., reference points 114 on cube 112) are at known locations in a reference frame such as a real-world coordinate system.

FIG. 1A shows a survey instrument 102 positioned at a point of interest 110. The survey instrument 102 includes a location measurement device such as a global navigation satellite system (GNSS) receiver 106 and an imaging device such as a camera 104 (e.g., a digital camera, a digital video camera, or the like). It should be appreciated that virtually any type of location measurement device or imaging device may be used in accordance with embodiments of the invention. For example the imaging device may comprise multiple cameras configured to obtain images that may include a panoramic view of a surrounding scene, cameras configured to obtain images that may include either distinct or overlapping views, or a single camera.

FIG. 1A also shows a cube 112 with reference points 114 on sides of the cube 112. The reference points 114 are at known locations in a reference frame and provide features for determining the pose of the camera 104. The reference points 114 may be referred to as control points. It should be appreciated that any point, line, region, or the like may be used as a reference point and that it is not necessary that the reference points 114 are located on the same object. For example, the reference points 114 may be located on one or more existing structures visible in a field of view of the camera 104. Also, any particular object may be used such as a horizontal bar or rod. The cube 112 and the reference points 114 are used merely as an example. Also, while any reference frame may be used with embodiments of the invention, the reference frame in this example is a real-world coordinate system that includes a Y-axis extending north-south (+ is north and − is south), an X-axis extending east-west (+ is east and − is west), and a Z-axis that is coaxial with a local gravity vector.

FIGS. 1B-1C show that the survey instrument 102 in this example is un-leveled with respect to the reference frame. FIG. 1B is a side-view showing that the survey instrument 102 is tilted away from the cube 112 in an easterly direction, and FIG. 1C is a top-view showing that the survey instrument 102 is tilted away from the cube 112 in a north-easterly direction.

The pose of the camera 104 in this example can be determined using image information obtained using the camera 104 and the locations of the reference points 114 in the reference frame. The image information is obtained by capturing one or more images of the cube 112 that include the reference points 114. The locations of the reference points 114 may be determined using the survey instrument 102 and conventional survey measurements (e.g., by measuring the locations of the reference points 114). Alternatively, the locations of the reference points 114 may be provided (e.g., determined previously). The locations include coordinates of one or more of the reference points 114 in the reference frame (or in any other reference frame with a known relationship so that coordinates can be transformed into a common reference frame).

Rather than providing the locations of all of the reference points 114, information about alignment of the cube 112 in the reference frame may be known along with a spatial relationship between the reference points 114. For example, the cube 112 may be aligned 'right and regular' with a local gravity vector and distances between the reference points 114 (e.g., in x,y,z coordinates) provided. In this case, the location of only one of the reference points 114 is needed to determine the locations of the other reference points 114.

Figure 2:
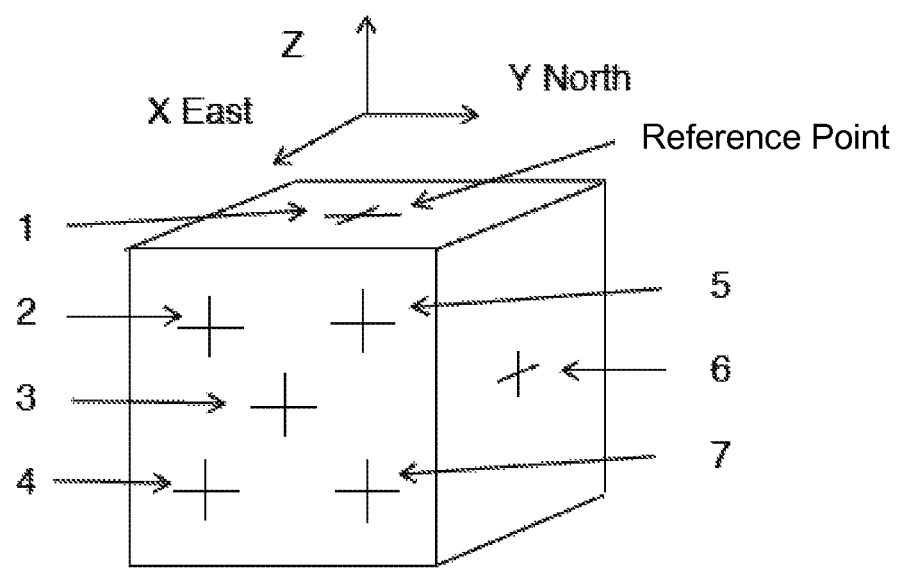
FIG. 2 is a simplified diagram of an object that may be used to determine pose of an imaging device in accordance with an embodiment of the invention.

FIG. 2 provides an example of a cube that is aligned with the same reference frame that is used in FIGS. 1A-1C and has a reference point on a top surface that is at a known location in the reference frame. If the reference point is assumed to have coordinates (0,0,0), TABLE 1 below provides a spatial relationship (and coordinates in this example) between the reference point and each of the other points. Units are in meters in this example and the cube is one meter on a side for ease of explanation. It should be appreciated that objects of any size or shape may be used with embodiments of the invention.

TABLE 1

| Ref. Pt. No. | Spatial Relationship (Coordinates) |
|---|---|
| 1 | (0, 0, 0) |
| 2 | (0.5, −0.25, −0.25) |
| 3 | (0.5, 0, −0.5) |
| 4 | (0.5, −0.25, −0.75) |
| 5 | (0.5, +0.25, −0.25) |
| 6 | (0, +0.5, −0.5) |
| 7 | (0.5, +0.25, −0.75) |

Using the image information and the locations of the reference points 114, the pose of the camera 104 can be determined using known matchmove techniques. In this embodiment, the matchmove techniques utilize feature-identification processes to identify the reference points 114 in the one or more images obtained using the camera 104. The cube 112 may include a survey reflector with a target to improve the feature-identification processes. The pose of the camera 104 relative to the reference points 114 is determined based on the positions of the reference points 114 in the one or more images and the known locations of the reference points 114 in the reference frame. Most matchmove techniques can determine the pose of the camera 104 from a single image that includes at least four of the reference points 114.

Examples of matchmove software applications that may be used with some embodiments include Voodoo Camera Tracker by Digilab, 3D-Equalizer by Science. D. Visions, Boujou by 2d3, MatchMover by Autodesk, PFTrack by The Pixel Farm, SynthEyes by Andersson Technologies, and VooCAT by Scenespector Systems.

Following is a list of references that provide additional details on various matchmove techniques. Each of these references are incorporated herein by reference in their entirety.

C. Wöhler, "3D Computer Vision: Efficient Methods and Applications," Guildford: Springer London, 2009.

F-E Ababsa, M. Mallem, "Robust camera pose estimation using 2d fiducials tracking for real-time augmented reality systems," Association for Computing Machinery (ACM), 2004.

F. Shi, X. Zhang, Y. Liu, "A new method of camera pose estimation using 2D-3D corner correspondence," Pattern Recognition Letters, 2004.

G. Simon, A. Fitzgibbon, and A. Zisserman, "Markerless tracking using planar structures in the scene," International Symposium on Augmented Reality (ISAR), 2000.

J. M. Frahm, K. Koser, and R. Koch, "Pose Estimation for Multi-Camera Systems," Deutsche Arbeitsgemeinschaft für Mustererkennung (DAGM), 2004.

J-S Park and B-J Lee, "Vision-based real-time camera match moving using a known marker," Optical Engineering (February 2006).

M-A Ameller, B. Triggs, and L. Quan, "Camera Pose Revisited: New Linear Algorithms," European Conference on Computer Vision (ECCV), 2000.

Some of the matchmove techniques referenced above can determine pose of the camera 104 in real-time, while others post-process data stored in memory. While accuracy varies depending on the specific technique, many techniques report sub-pixel accuracy.

Determining Pose Using Correspondences Between Images

Figure 3A:
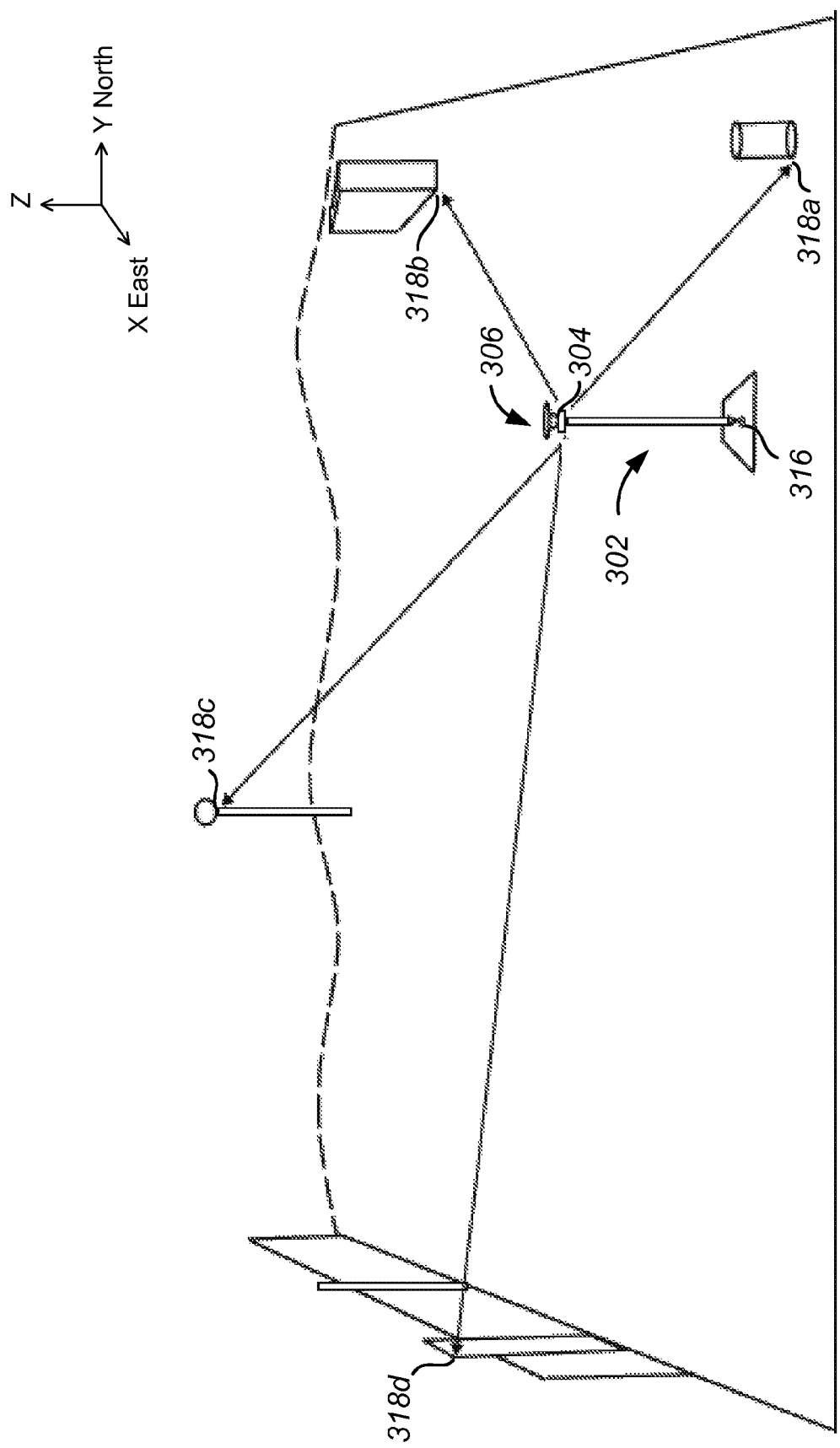
FIGS. 3A-3B are simplified diagrams illustrating a method of determining a pose of an imaging device that may be used to determine a tilt angle and tilt direction of a survey instrument in accordance with another embodiment of the invention.
Figure 3B:
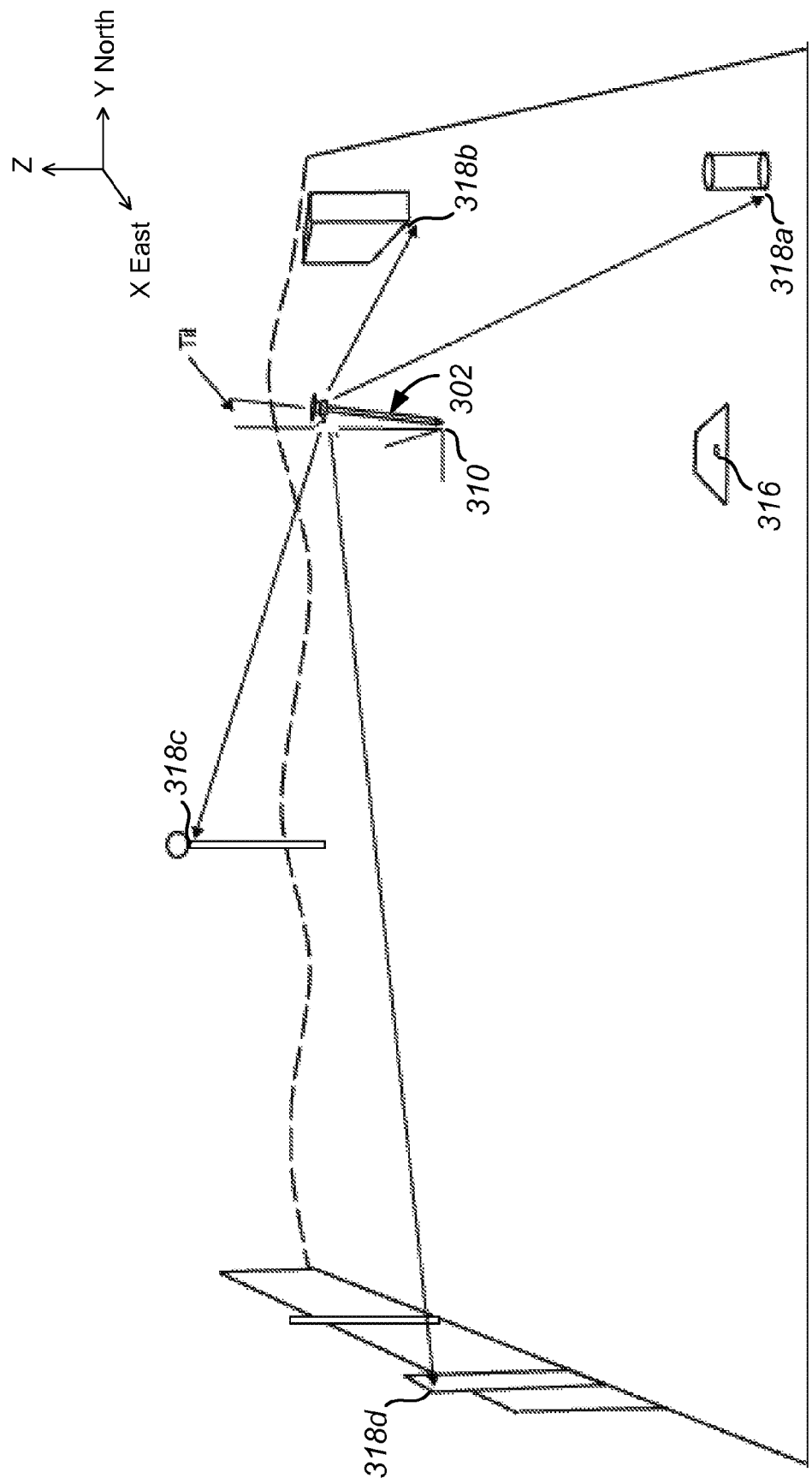

FIGS. 3A-3B are simplified diagrams illustrating a method of determining a pose of an imaging device. The pose may be used to determine tilt angle and tilt direction of a survey instrument in accordance with another embodiment of the invention. In this example, the pose is determined using correspondences between images where at least one of the images is acquired with the imaging device in a known (e.g., leveled) position. The image acquired with the imaging device in a known position serves as a reference against which changes in pose in other images can be determined.

FIG. 3A shows a survey instrument 302 positioned at an initial point 316. Like the survey instrument 102 shown in FIG. 1, the survey instrument 302 includes a location measurement device such as a GNSS receiver 306 and an imaging device such as a camera 304. FIG. 3A also shows several features 318a, 318b, 318c, 318d surrounding the survey instrument 302 that may be in a field of view of the camera 304. It should be appreciated that the features 318a, 318b, 318c, 318d may include points, lines, regions, contours, surfaces, areas of texture, and the like that can be detected in an image using known feature-identification processes. While only four such features are identified, the figure likely includes many hundreds of features that could be identified using feature-identification processes.

In this example it is not necessary that the features 318a, 318b, 318c, 318d be at known locations in a reference frame to determine the pose of the camera 304. Instead, in this example the survey instrument 302 is in a leveled position. The survey instrument 302 may be leveled according to known methods that may involve use of a bubble level indicating when the survey instrument is level to within an accuracy of the bubble level. In a leveled position, an image is captured using the camera 304. The image includes some of the features 318a, 318b, 318c, 318d surrounding the survey instrument 302. These features will serve as a reference against which at least a portion of the same features in another images can be compared and a change in pose determined.

Leveled in this example refers to alignment with a reference (e.g., vertical alignment with a local gravity vector). While any reference frame may be used with embodiments of the invention, the reference frame in this example is a real-world coordinate system like that of FIG. 1 that includes a Y-axis extending north-south (+ is north and − is south), an X-axis extending east-west (+ is east and − is west), and a Z-axis that is coaxial with a local gravity vector.

FIG. 3B shows the survey instrument 302 at a different location than that shown in FIG. 3A. The survey instrument 302 is at a point of interest 310. This figure also shows that the survey instrument 302 is un-level with respect to the reference frame. The survey instrument 302 has an unknown tilt angle in what appears to be a northerly direction. Similar to FIG. 3A, an image is captured that includes at least some of the same features 318a, 318b, 318c, 318d surrounding the survey instrument 302.

Using the image obtained with the survey instrument 302 at the initial position 316 and the image obtained with the survey instrument 302 at the point of interest 310, the pose of the camera at the point of interest 310 can be determined using known matchmove techniques. In this embodiment, the matchmove techniques utilize correspondences between the images. The pose is determined with reference to the pose at the initial position 316 in a leveled position.

Most of the same matchmove software applications and references listed above can also be used to determine pose using correspondences between images. U.S. patent application Ser. No. 13/167,733, filed Jun. 24, 2011, provides additional details on matchmove techniques using correspondences between images. The pose of the camera is determined based on the positions of the features 318a, 318b, 318c, 318d in the image acquired with the survey instrument 302 in a known position (leveled) and the positions of the features 318a, 318b, 318c, 318d in the image acquired with the survey instrument 302 in a unknown position (un-leveled).

Figure 4A:
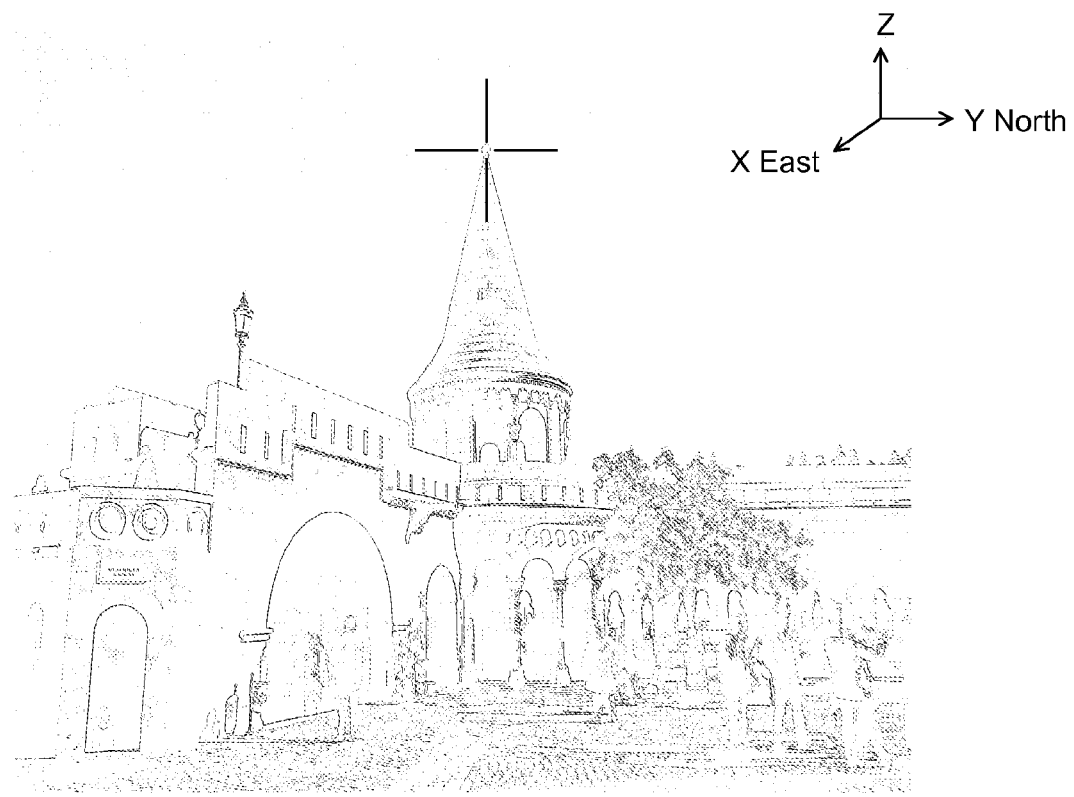
FIGS. 4A-4B are simplified diagrams illustrating a change in pose of an imaging device between a first image and a second image.
Figure 4B:
Figure 4B:
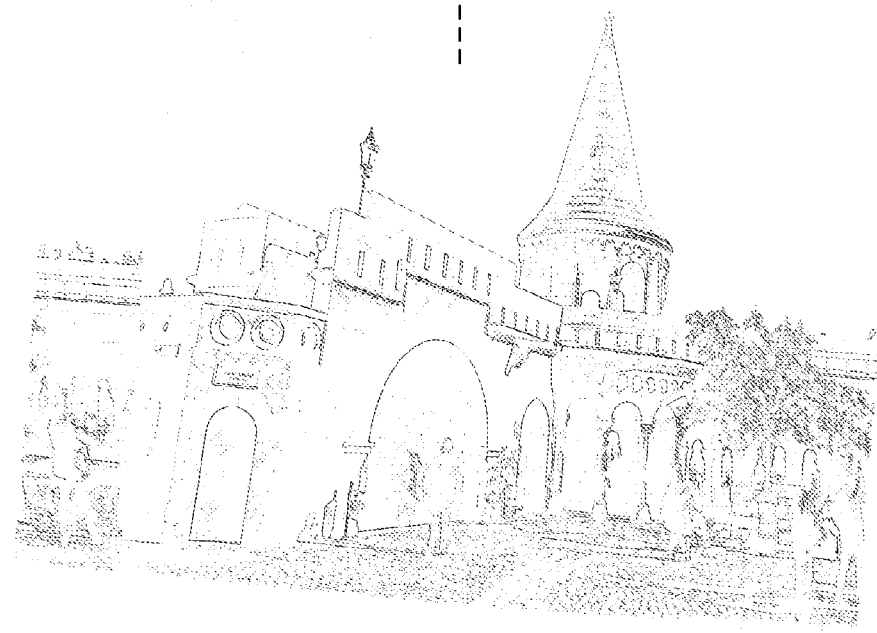

Positions of the features 318a, 318b, 318c, 318d will be different in the two images. This is illustrated from a camera point of view in FIGS. 4A-4B. FIG. 4A shows an image of a building with a camera at an initial pose (assume leveled). FIG. 4B shows an image of the building with the camera at a slightly different pose (assume un-leveled). The crosshairs identify approximately the same image location and aide in illustrating rotation of the camera between the images. The camera has been rotated counter-clockwise about X and Z axes between the images. Changes in pose between images can be determined when the camera is rotated as shown in FIGS. 4A-4B or when the camera is moved to a new location (and rotation) as shown in FIGS. 3A-3B.

Most matchmove techniques are configured to identify and track features in images. These features often include arbitrary points located at arbitrary locations. Often many hundreds of such features can be identified and tracked between images. Many matchmove techniques can use planar structures (e.g., the ground or building facades), surfaces, edges, corners of objects, and the like to determine pose based on correspondences between just one or two of such features. Some matchmove techniques automatically detect features in images, analyze correspondences, eliminate outliers, and incrementally estimate and refine camera parameters. Matchmove software applications often utilize a menu format and may provide location and orientation information using menus such as 'View→Camera Parameters' or the like.

It should be appreciated that while only two images are used in the examples shown in FIGS. 3A-3B and 4A-4B, changes in pose between any number of images can be determined as long as a sufficient number of correspondences between images can be identified. Also, common correspondences are not required between every image in a series as long as each image has a sufficient number of correspondences with another image so that changes in pose can be linked back to the reference image.

The number of correspondences required between any two images depends on the particular matchmove technique. In an embodiment, the number of correspondences required may be used to implement a warning signal (e.g., visual and/or audible cue) should the number of correspondences approach or drop below a required threshold. For example, if more than half of the initial reference points are lost after moving from an initial point of interest to a new point of interest, an indication may be provided to a user via audible or visual signaling on a data collector or controller. Upon receiving such a warning, an orientation of the survey instrument may be adjusted to capture an image with more features that are common with other images. Alternatively, the survey instrument may be re-leveled and a new reference established. In other embodiments, other indications of loss of overall accuracy may be used to trigger a warning signal, such as reduced accuracy of camera pose as determined by internal matchmove camera metrics or a distance from a reference measurement station.

Determining Pose Using Features at Known Locations & Correspondences Between Images In some embodiments, combinations of the above methods may be used to determine pose of a camera. For example, the pose may be determined from an image having features at known locations as described above. Using this pose as a reference, one or more additional images may be captured and changes in pose determined using correspondences between the images as also described above. In these embodiments, it is not necessary to level the survey instrument to obtain a reference image. Instead, the image with features at known locations may be used as the reference image.

Using Pose to Determine Tilt Angle and Tilt Direction

Following is an example of some of the steps and calculations that may be used to determine tilt angle and tilt direction of a survey instrument using a pose of a camera in accordance with an embodiment of the invention. It should be appreciated that the steps and calculations described herein are exemplary and that one of ordinary skill in the art would recognize many variations, modifications, and alternatives in light of the present disclosure.

Figure 5:
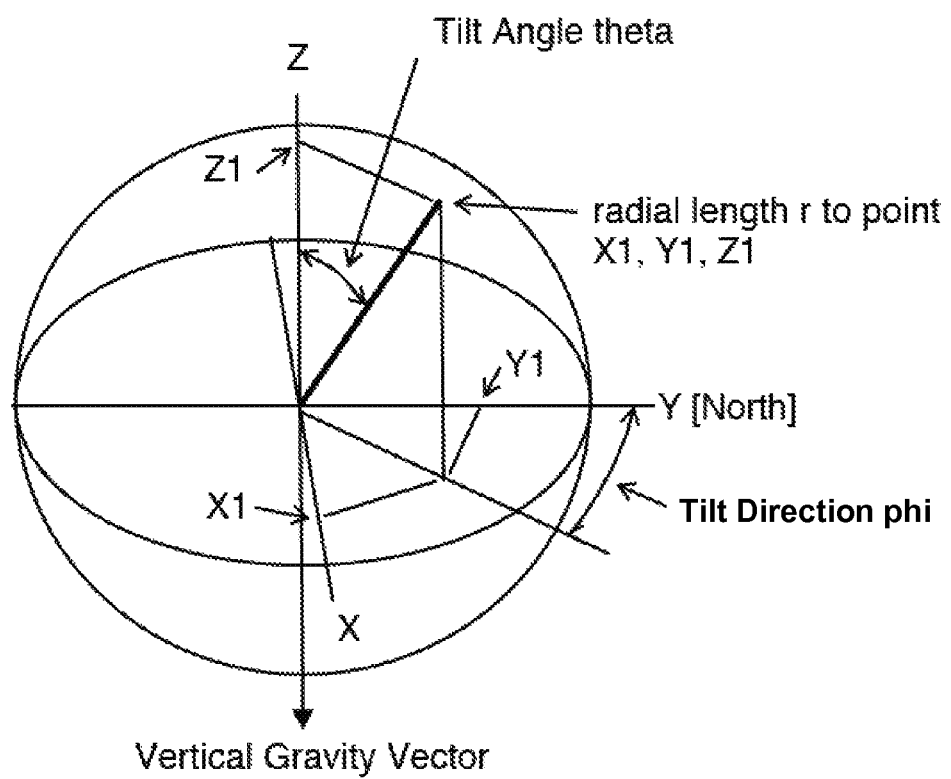
FIG. 5 is a simplified diagram of a spherical coordinate frame overlaid with a conventional Cartesian coordinate frame.

Matchmove software applications typically output pose data in a CAHV format (a convention commonly used in machine vision), whereas the reference (or coordinate) frame of interest for survey applications is spherical. Spherical coordinates provide tilt angle (generally referred to as theta) relative to a vertical axis such as a gravitational vector and tilt direction (generally referred to as phi) relative to some reference such as true or magnetic north. The tilt angle and tilt direction determine a vector r emanating from a zero reference point and extending to an imaginary point on a sphere. This is shown in FIG. 5, where a spherical coordinate frame is overlaid with a conventional Cartesian coordinate frame for reference. One or more coordinate transformations using known techniques may be used to transform the data from the CAHV format to spherical coordinates.

Figure 6:
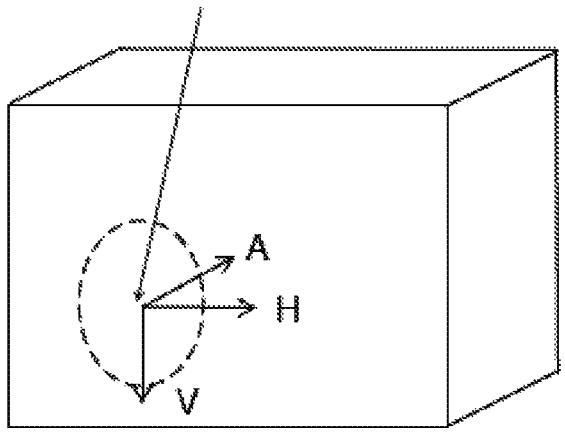
FIG. 6 is a simplified diagram of an imaging device and a CAHV reference frame.

In the CAHV format, C provides a distance from a feature in a field of view to a perspective center (or entrance pupil) of an imaging device. The perspective center is generally on an axis passing through a lens of the imaging device. As shown in FIG. 6, axes A, H, and V are orthogonal coordinate axes with +V extending downward and +A extending inward along a lens axis.

Figure 7:
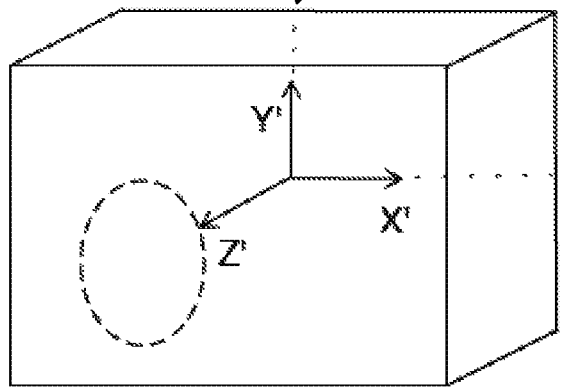
FIG. 7 is a simplified diagram of an imaging device and an X',Y',Z' camera reference frame.

A coordinate transform may be used to convert the data from the CAHV format to an intermediate X',Y',Z' camera reference frame such as that illustrated in FIG. 7. In this intermediate reference frame, X' and Y' lie along an image plane that may be near a rear of the camera, and Z' extends outward along a lens axis. The coordinate transform is described in detail in Di, K. and Li, R., "CAHVOR camera model and its photogrammetric conversion for planetary applications," J. Geophys. Res., 2004, which is incorporated herein by reference in its entirety.

Figure 8:
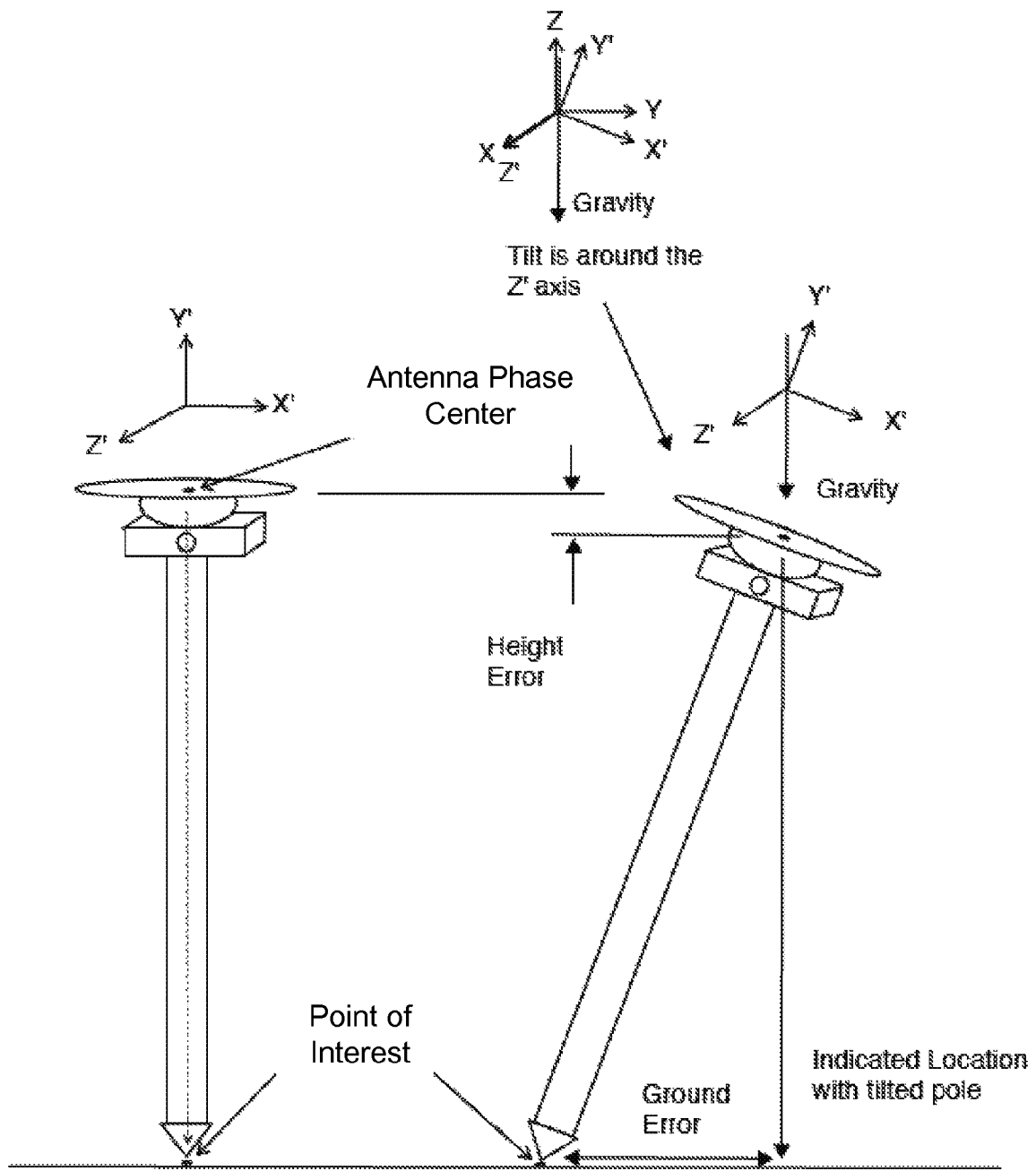
FIG. 8 is a simplified diagram illustrating an X',Y',Z' camera reference frame tilting with a survey instrument while an X,Y,Z real-world coordinate frame remains aligned with a local gravity vector.

A second coordinate transform using known techniques may be used to convert the data from the X',Y',Z' camera reference frame to a real-world (e.g., GNSS or GPS) coordinate frame. In the real-world coordinate frame, Z extends in a vertical direction parallel to a gravity vector, and X and Y extend along a horizontal plane. This is shown in FIG. 8, where the X',Y',Z' camera reference frame tilts with the an imaging device as the survey instrument is tilted from a leveled position on the left to an un-leveled position on the right. The real-world coordinate frame does not tilt with the imaging device. This is shown at the top of FIG. 8 where the X,Y,Z axes of the real-world coordinate frame remain aligned with a local gravity vector as the X',Y',Z' axes of the camera reference frame tilt around the Z' axis.

The data may be converted from the real-world coordinate frame to spherical coordinates using known conversions. The vector r may be determined using the equation:

$$r=[X^2+Y^2+Z^2]^{1/2} \qquad \text{Equation (1)}$$

Figure 9A:
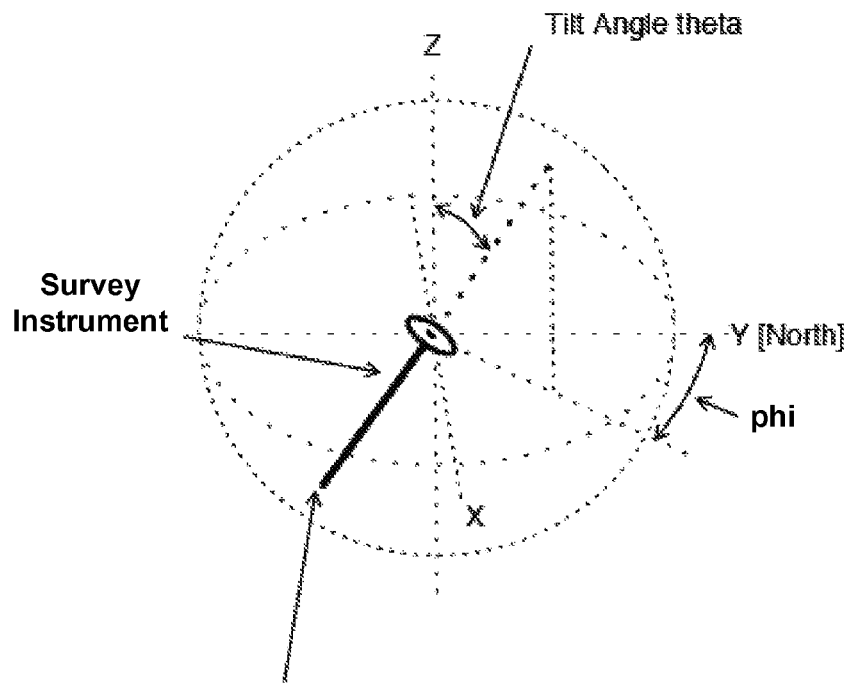
FIGS. 9A-9B are simplified diagrams showing a survey instrument in a spherical coordinate frame in accordance with an embodiment of the invention.
Figure 9B:
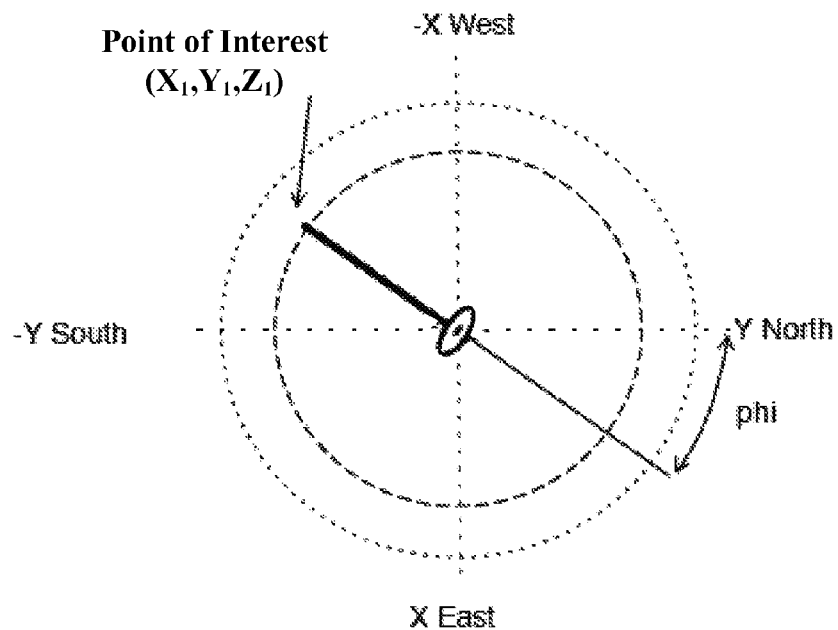

As illustrated in FIGS. 9A-9B, the vector r can represent a distance from an antenna phase center of a GNSS receiver to a point of interest located at real-world coordinates ($X_1, Y_1, Z_1$). In embodiments where the survey instrument includes a support pole, this is the distance from the antenna phase center to a tip of the support pole (typically about 2 meters). FIG. 9A is a perspective view showing a survey instrument having a tilt angle (theta) from a vertical axis Z in a northwesterly tilt direction (phi). The tilt direction (phi) is more easily seen in the top down view shown in FIG. 9B (looking down along the Z axis).

Using real-world coordinates X,Y,Z, the tilt angle and tilt direction of the survey instrument can be determined using the equations:

$$\text{Tilt Angle(theta)}=\arccos(Z/r) \qquad \text{Equation (2)}$$

$$\text{Tilt Direction(phi)}=\arctan(Y/X) \qquad \text{Equation (3)}$$

Determining Location of Point of Interest

A location of a point of interest can be determined using a location of a survey instrument and a tilt angle and tilt direction of the survey instrument. Referring to the example of FIG. 1, a survey instrument 102 may include a location measurement device such as a GNSS (or GPS) receiver 106. A distance along a vertical axis from an antenna phase center to a point of interest is known when a survey instrument is leveled as shown on the left in FIG. 8. Using an un-leveled survey instrument, however, as shown on the right in FIG. 8, introduces a height error and a ground error. A vertical height of the antenna phase center above the ground is unknown because of the height error, and a horizontal distance from the antenna phase center to the point of interest is unknown because of the ground error. The ground error may include X and Y components in a real-world coordinate system.

The following equations can be used to determine the X and Y components of the ground error and the Z component of the height error:

$$X_1=r*\sin(\text{theta})*\cos(\text{phi}) \qquad \text{Equation (4)}$$

$$Y_1=r*\sin(\text{theta})*\sin(\text{phi}) \qquad \text{Equation (5)}$$

$$Z_1=r*\cos(\text{theta}) \qquad \text{Equation (6)}$$

Where r is the distance from the antenna phase center to a tip of the support pole using the survey instrument shown in the example of FIG. 8.

While methods have been described for performing survey measurements using an un-leveled survey instrument, it should be appreciated that measurement error will increase with larger tilt angles. Thus, in some embodiments the survey instrument may be configured to provide an warning (e.g., audio or visual cue) if the tilt exceeds a specified angle. In such a situation, a surveyor may repeat a measurement with the survey instrument in a more vertical position.

Example Calculation of Location of Point of Interest

Following is an example calculation of the location of the point of interest 110 shown in FIG. 1 assuming that the tilt angle is determined to be 10° from vertical and the tilt direction is determined to be 30° from north. These values can be determined using matchmove techniques and coordinate transformations as described above. Coordinates of the antenna phase center of the GNSS receiver 106 are determined to be (10 m, 3 m, 0.97 m) relative to the reference point 114 on the top surface of the cube 112 (arbitrarily assigned coordinates (0,0,0)), and the vector r has a length of 2 meters. Using these values and Equations (4)-(6), the location of the point of interest 110 from the antenna phase center is (−0.174 m, −0.301 m, −1.970 m). Thus, the point of interest 110 is 0.174 meters west and 0.301 meters south of the antenna phase center along X and Y axes and 1.970 meters below the antenna phase center along the Z axis.

Survey Instrument Configuration

Figure 10A:
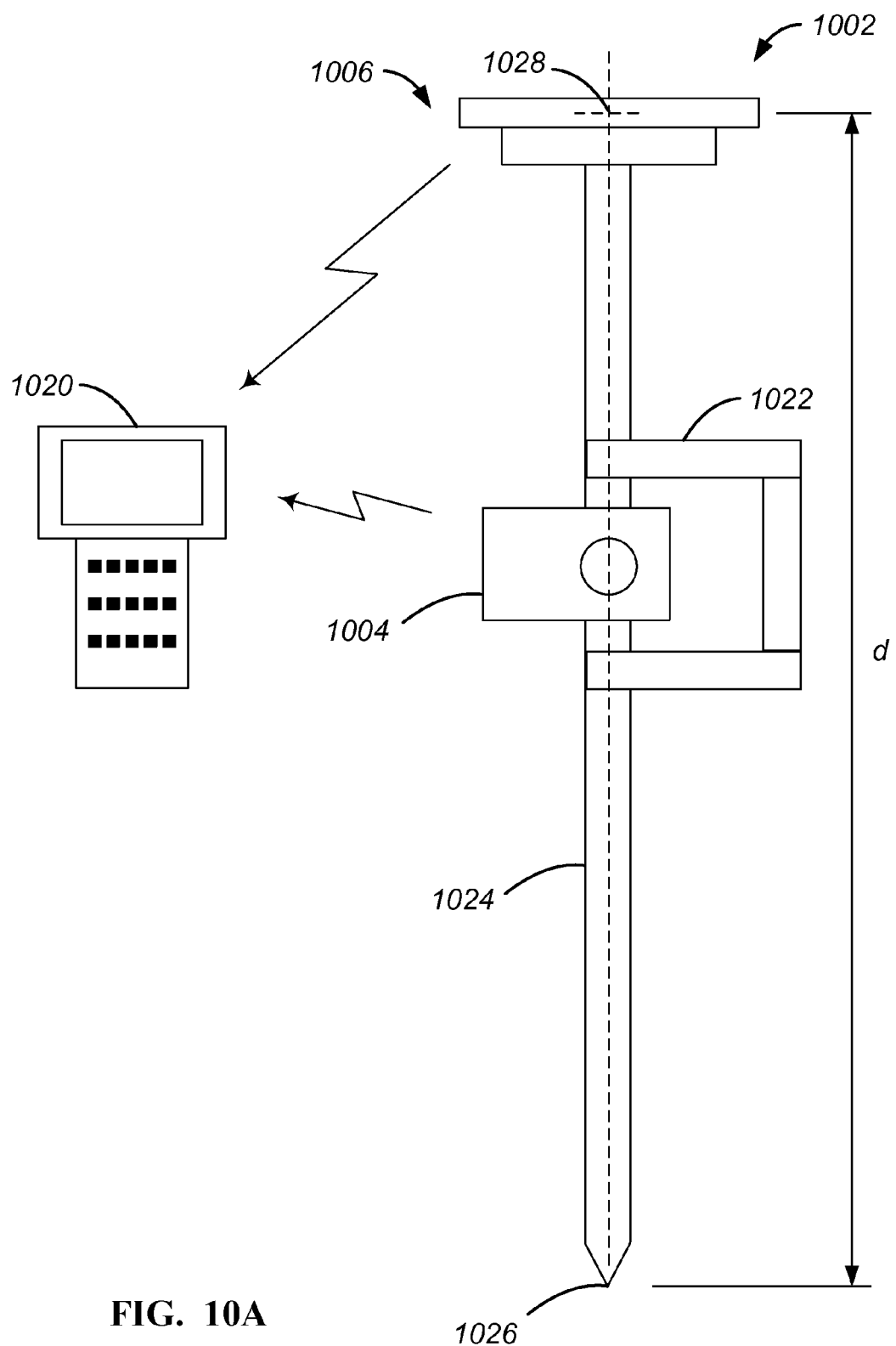
FIGS. 10A-10C are simplified diagrams of survey instruments that may be used to determine tilt angle and tilt direction in accordance with some embodiments of the invention.
Figure 10B:
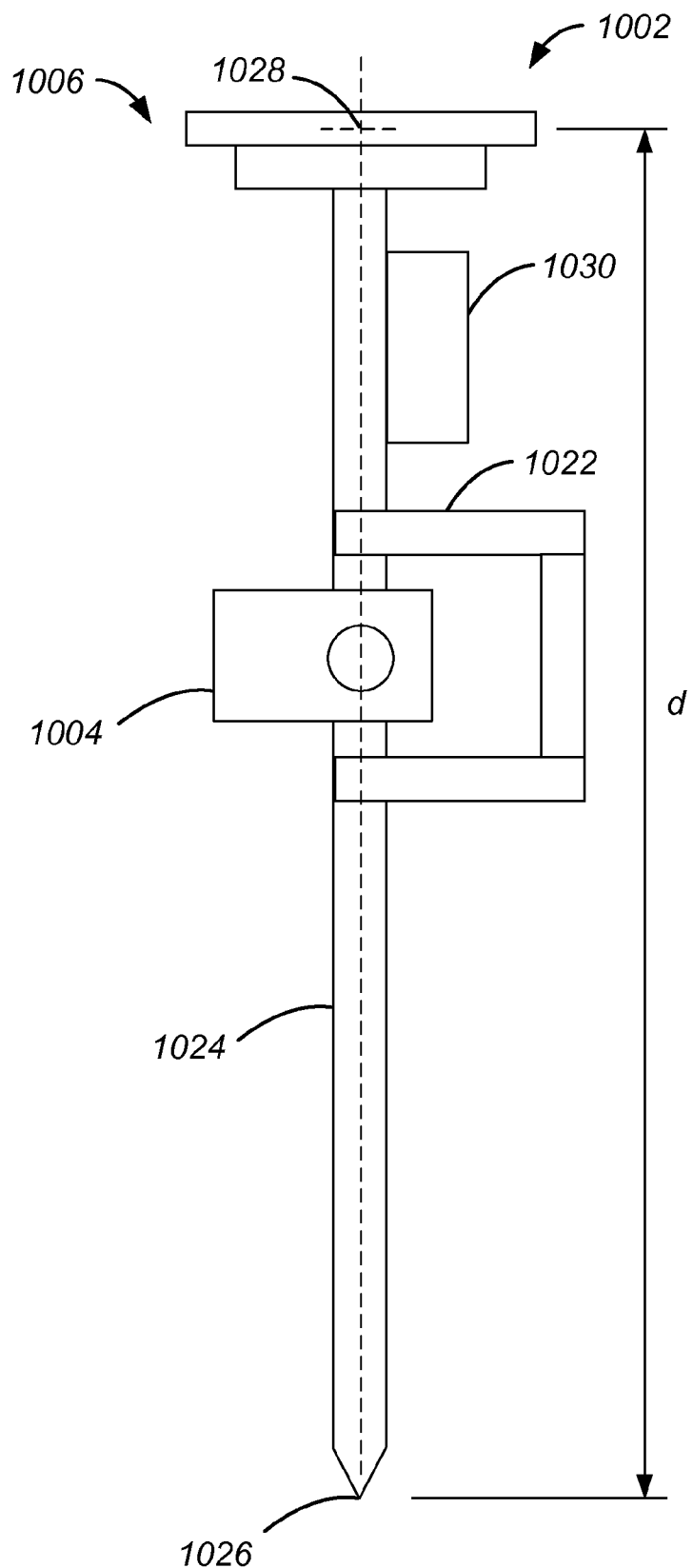
Figure 10C:
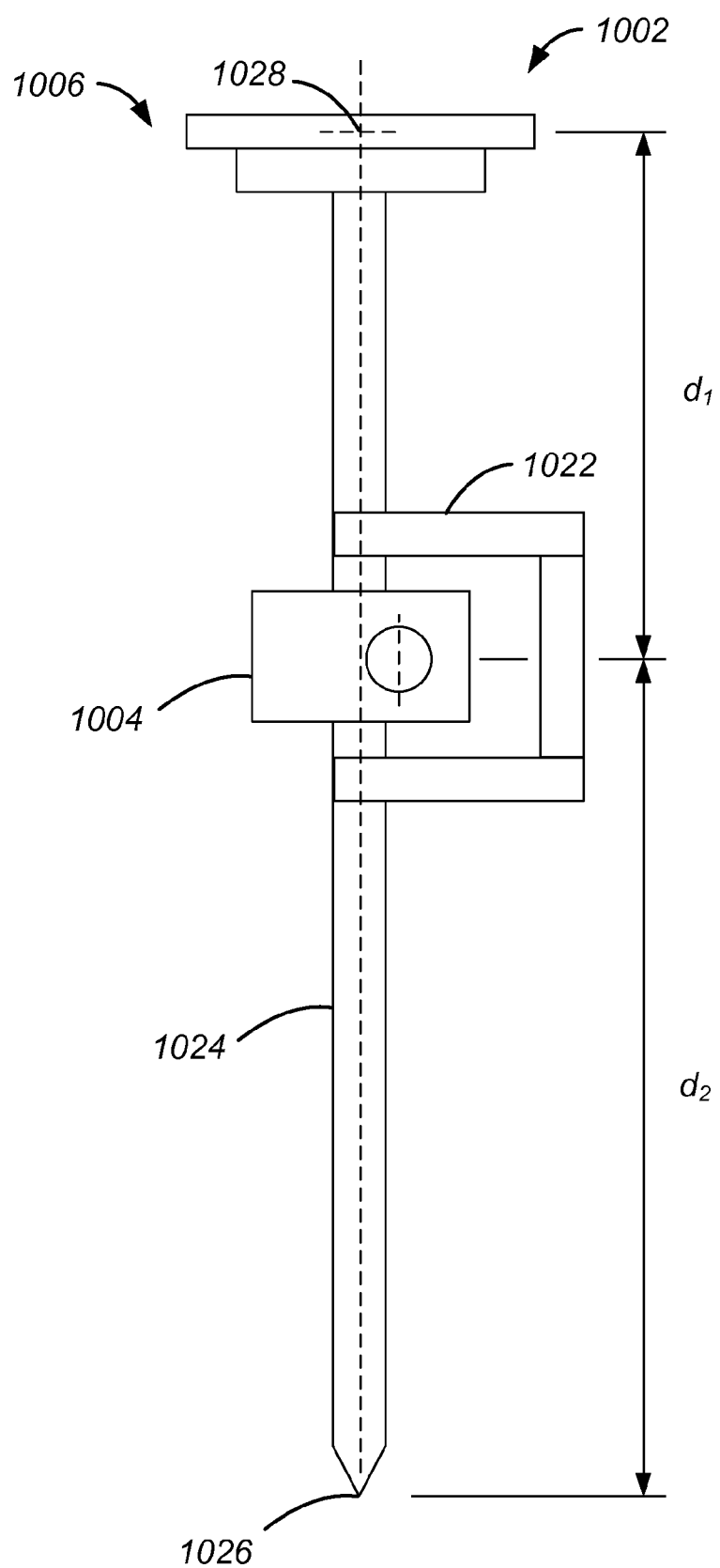

FIGS. 10A-10C are simplified diagrams of survey instruments that may be used to determine tilt angle and tilt direction in accordance with some embodiments of the invention. It should be appreciated that the survey instruments shown herein are provided merely as examples and that embodiments of the present invention may be used with other survey instruments that include different features and/or configurations.

FIG. 10A shows a survey instrument 1002 that includes a location measurement device such as a GNSS (or GPS) receiver 1006 and an imaging device such as a camera 1004. The GNSS receiver 1006 is configured to determine a location of an antenna phase center 1028 and the camera 1004 is configured to obtain image information. The GNSS receiver 1006 and the camera 1004 are coupled to a support pole 1024. In this example, the camera 1004 is coupled to the survey instrument 1002 near a handle 1022 of the support pole 1024 rather than below the GNSS receiver as shown in the example of FIG. 1.

The GNSS receiver 1006 and the support pole 1024 are arranged such that the antenna phase center 1028 of the GNSS receiver 1006 and a tip 1026 of the support pole 1024 have a known spatial relationship (e.g., both aligned with a vertical axis and having a known length d between them). The camera 1004 may also be arranged such that the same vertical axis passes through the entrance pupil of the camera 1004. In some embodiments, a distance between the antenna phase center 1028 of the GNSS receiver 1006 and the entrance pupil of the camera 1004 may also be known.

FIG. 10A also shows a controller 1020 in electrical communication with the GNSS receiver 1006 and the camera 1004. In this example the electrical communication is wireless although other modes of communication may be used with other embodiments. The controller 1020 may include one or more inputs and one or more outputs such as the buttons and display screen shown in this figure. The controller 1020 may also be configured to send and receive data from other devices. The controller 1020 may include a processor configured to receive location information from the GNSS receiver 1006 and receive image information from the camera 1004. The processor may also be configured to determine a pose of the camera 1004 using matchmove techniques and to determine a tilt angle and tilt direction of the survey instrument 1002 as described previously. In some embodiments, the processor may also be configured to determine a location of a tip 1026 of the support pole 1024 (or a location of a point of interest).

The controller 1020 may include memory for storing the information received from the GNSS receiver 1006 and the camera 1004. Computer code may also be stored in the memory with instructions that are executable by the processor to determine the pose of the camera 1004, the tilt angle and tilt direction of the survey instrument 1002, and the location of the tip 1026 of the support pole 1024.

It should be appreciated that the processor and memory are not limited. The processor may include one or more general purpose microprocessors or application specific integrated circuits (ASICs) and at least part of the instructions may be embodied in software, firmware, and/or hardware. The memory may include an operating system and one or more software applications for determining the tasks described above in accordance with embodiments of the invention. The memory may include any type of non-transitory media including magnetic storage media, optical storage media, flash memory, and the like.

FIG. 10B shows a survey instrument 1002 similar to that of FIG. 10A except that in this example a controller 1030 is coupled to the support pole 1024. The controller 1030 may be configured in a manner similar to that of the controller 1020 shown in FIG. 10A. The controller 1030 may be configured to electrically communicate with the GNSS receiver 1006 and the camera 1004 using wired or wireless communications. The controller 1030 may also be configured to send and receive data from other devices.

FIG. 10C shows a survey instrument 1002 similar to that of FIGS. 10A-10B except that in this example the entrance pupil of the camera 1004 is not aligned with the vertical axis passing though the antenna phase center 1028 and the tip of the support pole 1024. Instead, in this example the entrance pupil of the camera 2004 is slightly off center from the vertical axis and a distance $d_1$ below the antenna phase center 1028. This configuration may be used to determine a pose of the camera 1004 and a tilt angle and tilt direction of the survey instrument 1002 in a manner similar to the configurations shown in FIG. 10A-10B. If this configuration were also used to determine coordinates of the entrance pupil of the camera 1004, however, a spatial relationship (e.g., distance $d_1$ and offset from the vertical axis) between the antenna phase center 1028 and the entrance pupil must be determined.

Figure 11A:
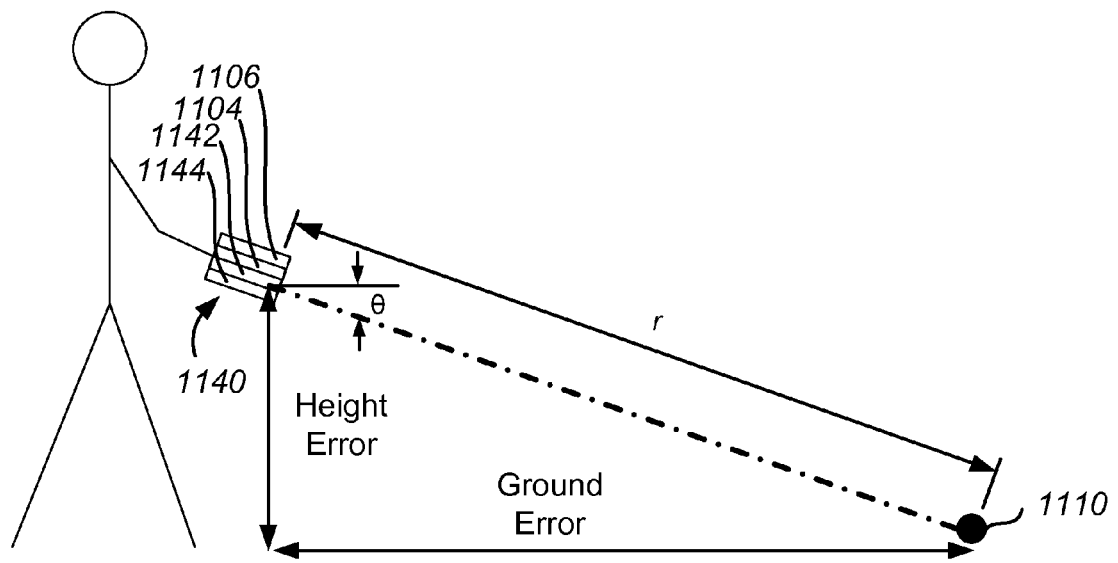
FIGS. 11A-11B are simplified diagrams of survey instrument that may be used to determine tilt angle and tilt direction in accordance with other embodiment of the invention.

FIG. 11A is a simplified diagram of a handheld device 1140 that may be used to determine tilt angle and tilt direction in accordance with an embodiment of the invention. The handheld device 1140 may include a location measurement device such as a GNSS (or GPS) receiver 1106 and an imaging device such as a camera 1104. In the example shown in FIG. 11A, the GNSS receiver 1106 and the camera 1104 are integrated within the handheld device 1140. The handheld device 1140 also includes a distance measuring device 1142 for determining a distance r between the handheld device 1140 and the point of interest 1110. The distance measuring device 1142 may be a conventional electronic distance measurement (EDM) device or may determine distance using known sonic measurement techniques. The handheld device 1140 may also include a pointing device 1144 such as a laser pointer for aligning the handheld device 1140 with a point of interest 1110.

A pose of the handheld device 1140 (or the imaging device) may be determined using known matchmove techniques as described above. For example, the pose may be determined using features in an image where the features are at known locations in a reference frame. The pose may also be determined using correspondences between images where at least one of the images is acquired with the imaging device in a known (e.g., leveled) position. A tilt angle (theta) and a tilt direction (phi) may then be determined using known transformations and Equations (1)-(3) as described above. Equations (4)-(6) may be used to determine X and Y components of a ground error and a Z component of a height error.

Figure 11B:
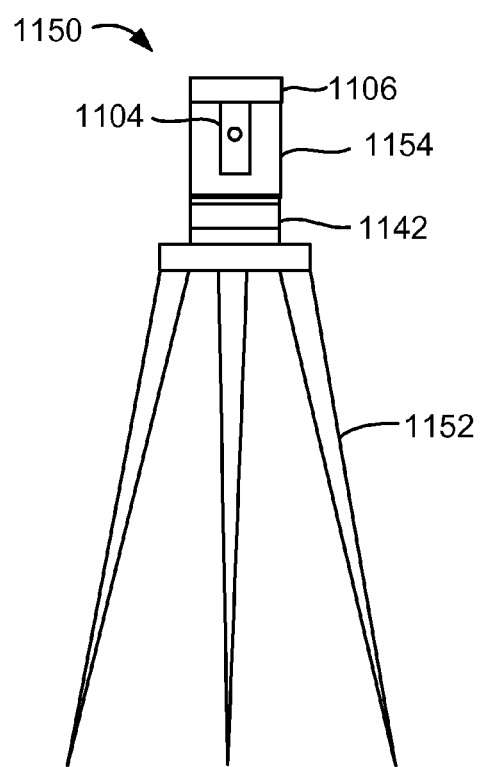

FIG. 11B is a simplified diagram of an optical survey instrument 1150 (such as an optical total station) coupled to a tripod 1152 that may be used to determine tilt angle and tilt direction in accordance with an embodiment of the invention. The optical survey instrument 1150 may include a location measurement device such as a GNSS (or GPS) receiver 1106 and an imaging device such as a camera 1104. The optical survey instrument 1150 also includes a distance measuring device 1142 for determining a distance r between the optical survey instrument 1150 and a point of interest (not shown). The distance measuring device 1142 may be a conventional electronic distance measurement (EDM) device or may determine distance using known sonic measurement techniques. The optical survey instrument 1150 may also include an alignment unit 1154 such as a theodolite for aligning the optical survey instrument 1150 with a point of interest and determining an azimuth or angle of rotation about a vertical axis relative to a reference such as true north, magnetic north, or any other reference.

A pose of the camera 1104 may be determined using known matchmove techniques as described above. For example, the pose may be determined using features in an image where the features are at known locations in a reference frame. The pose may also be determined using correspondences between images where at least one of the images is acquired with the imaging device in a known (e.g., leveled) position. A tilt angle (theta) and a tilt direction (phi) may then be determined using known transformations and Equations (1)-(3) as described above. Equations (4)-(6) may be used to determine X and Y components of a ground error and a Z component of a height error in a manner similar to that illustrated in FIG. 11A.

Determining Tilt Angle and Tilt Direction Using Image Processing

Figure 12:
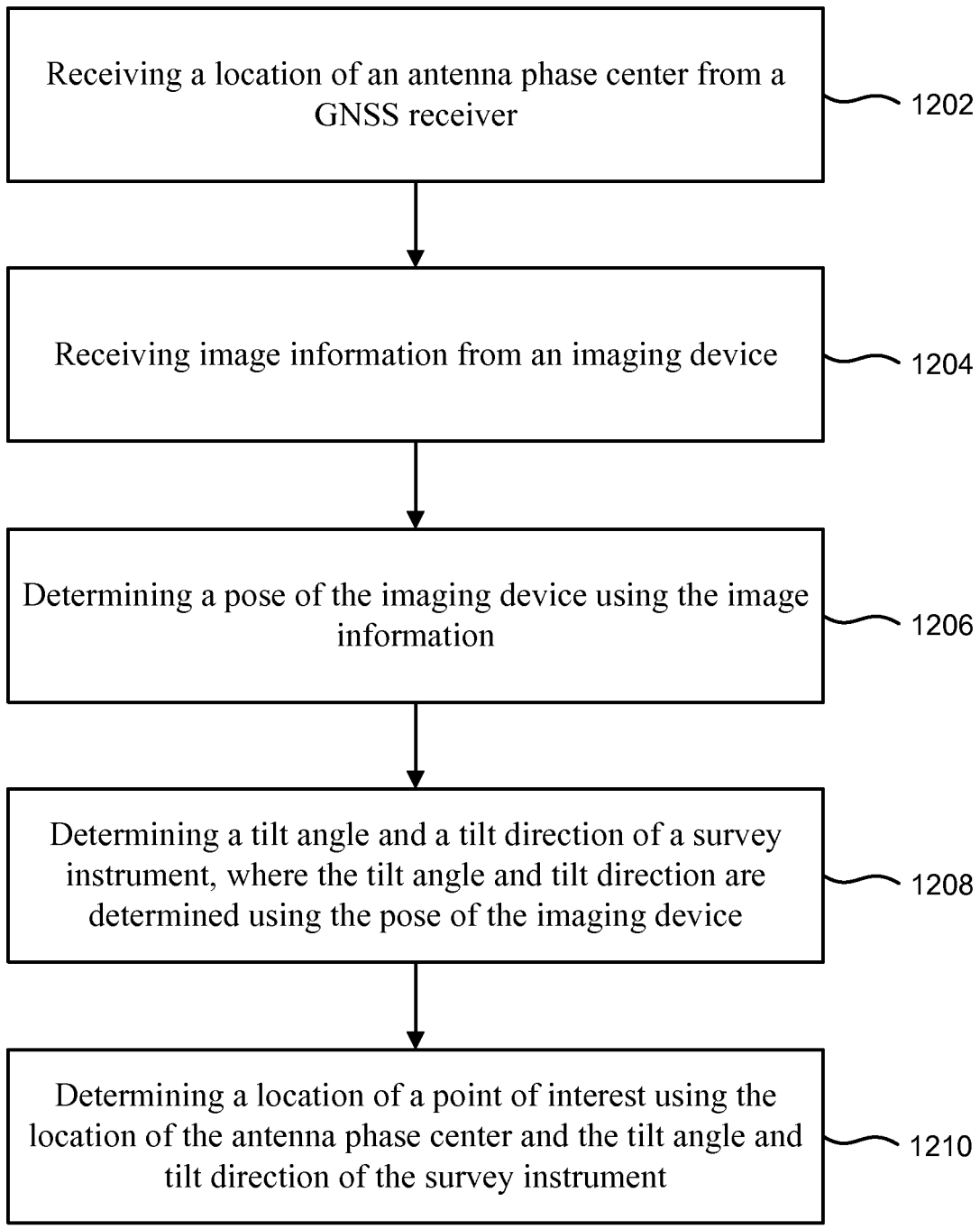
FIG. 12 is a flowchart providing a method of determining a location of a point of interest in accordance with an embodiment of the invention.

FIG. 12 is a flowchart providing a method of determining a location of a point of interest in accordance with an embodiment of the invention. The method includes receiving a location of an antenna phase center from a GNSS receiver (1202) and receiving image information from an imaging device (1204). The imaging device may be a digital camera, and the image information may include one or more images that include features from a scene surrounding the imaging device. In one embodiment, the features are at known locations in a reference frame such as a real-world coordinate system. In another embodiment, the features may include arbitrary points, lines, regions, contours, surfaces, areas of texture, and the like that can be detected in an image using known feature-identification processes.

The method also includes determining a pose of the imaging device using the image information (1206). The pose is determined using known matchmove techniques. The method also includes determining a tilt angle and a tilt direction of a survey instrument, where the tilt angle and tilt direction are determined using the pose of the imaging device (1208). The tilt angle and tilt direction can be determined from the pose using coordinate transforms. The method also includes determining a location of the point of interest using the location of the antenna phase center and the tilt angle and the tilt direction of the survey instrument (1210).

Figure 13:
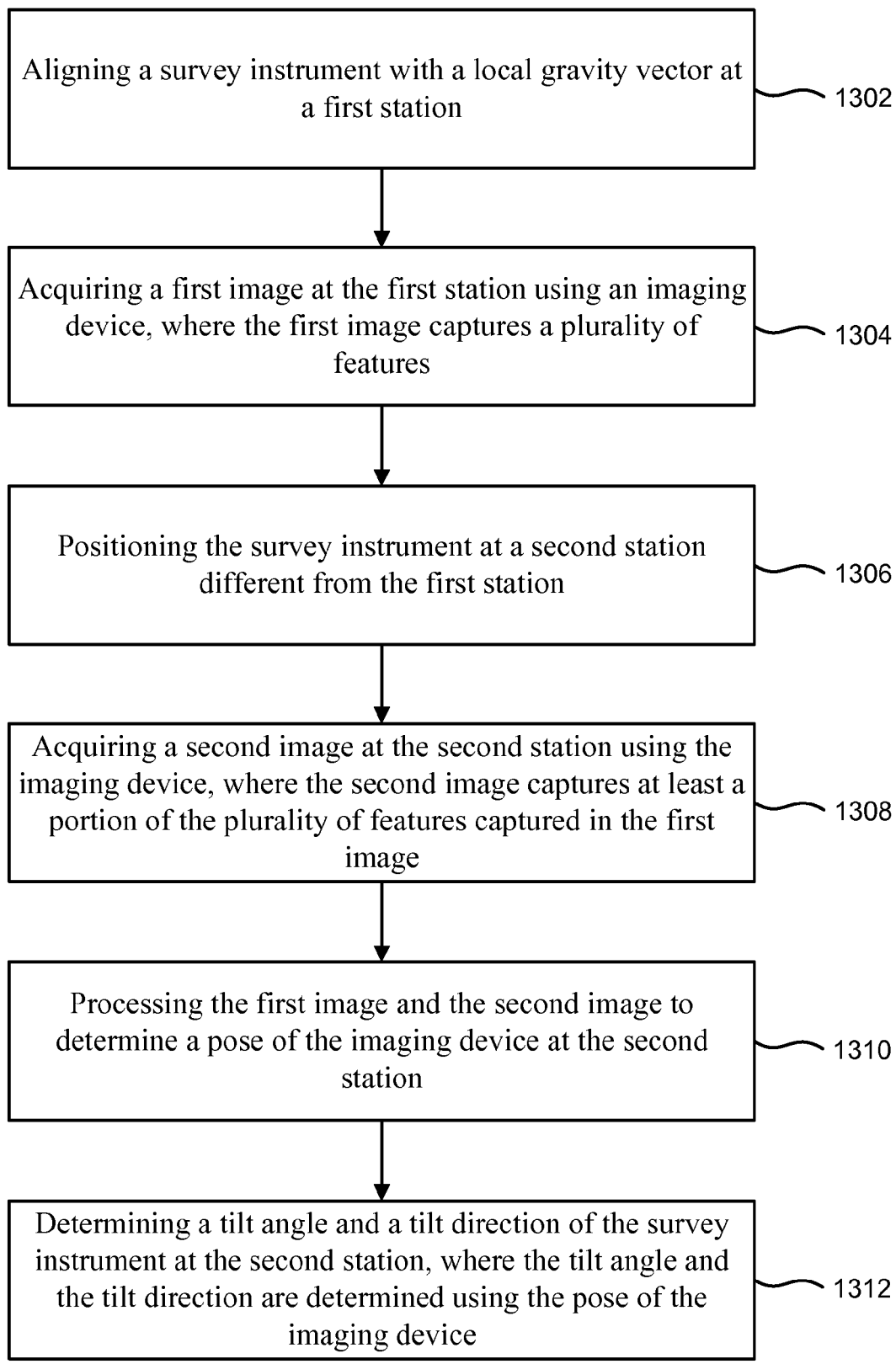
FIG. 13 is a flowchart providing a method of determining a tilt angle and tilt direction of a survey instrument in accordance with an embodiment of the invention.

FIG. 13 is a flowchart providing a method of determining a tilt angle and tilt direction of a survey instrument in accordance with an embodiment of the invention. The method includes aligning the survey instrument with a local gravity vector at a first station (1302). The first station may be a measurement location from which a reference image is obtained (or a reference measurement station). The survey instrument may be aligned with the local gravity vector using a bubble level, tilt sensors, or other leveling techniques. It should be understood that the alignment is determined to within some accuracy that depends on the particular leveling technique. The method also includes acquiring a first image at the first station using an imaging device, where the first image captures a plurality of features (1304). The features may include arbitrary points, lines, regions, contours, surfaces, areas of texture, and the like that can be detected in an image using known feature-identification processes. The method also includes positioning the survey instrument at a second station different from the first station (1306) and acquiring a second image at the second station using the imaging device, where the second image captures at least a portion of the plurality of features captured in the first image (1308). It is not necessary for the survey instrument to be aligned with the local gravity vector at the second station. The method also includes processing the first image and the second image to determine a pose of the imaging device at the second station (1310). The images are processed using known matchmove techniques using correspondences between the images. The method also includes determining the tilt angle and the tilt direction of the survey instrument at the second station, where the tilt angle and the tilt direction are determined using the pose of the imaging device (1312). The tilt angle and tilt direction can be determined from the pose using coordinate transforms.

It should be appreciated that the specific steps illustrated in FIGS. 12-13 provide particular methods according to embodiments of the present invention. Other sequences of steps may also be performed according to alternative embodiments. For example, alternative embodiments may perform the steps outlined above in a different order. Moreover, the individual steps illustrated in FIGS. 12-13 may include multiple sub-steps that may be performed in various sequences. Furthermore, additional steps may be added or removed depending on the particular application.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A survey instrument, comprising:
    a support pole having a first end and a second end;
    a global navigation satellite system (GNSS) receiver coupled to the first end of the support pole and having a known spatial relationship with the second end of the support pole, the GNSS receiver configured to determine a location of an antenna phase center of the GNSS receiver in a reference frame;
    an imaging device coupled to the support pole, the imaging device configured to obtain image information;
    a processor in electrical communication with the GNSS receiver and the imaging device, the processor configured to:
        receive the location of the antenna phase center from the GNSS receiver;
        receive the image information from the imaging device;
        determine a pose of the imaging device using the image information;
        determine a tilt angle of the support pole and a tilt direction of the support pole in the reference frame, the tilt angle and the tilt direction of the support pole determined using the pose of the imaging device; and
        determine a location of the second end of the support pole in the reference frame, the location determined using the location of the antenna phase center of the GNSS receiver and the tilt angle and the tilt direction of the support pole.

2. The survey instrument of claim 1 wherein the image information includes a first image captured at a first location with the support pole substantially parallel to a local gravity vector, and a second image captured at a second location, and wherein the pose of the imaging device is determined based on features in the first image compared to the features in the second image.

3. The survey instrument of claim 1 wherein the tilt angle of the support pole is determined with reference to a local gravity vector.

4. The survey instrument of claim 1 wherein the image information includes a plurality of images each capturing features that are common with another one of the plurality of images and at least one of the plurality of images is captured while the support pole is substantially parallel to a local gravity vector, and wherein the processor is configured to process the image information using correspondences between the plurality of images.

5. The survey instrument of claim 1 wherein the processor is configured to process the image information using a feature-identification process, and the image information includes at least one image capturing features having known locations in the reference frame.

6. The survey instrument of claim 1 wherein the imaging device and the antenna phase center of the GNSS receiver are arranged in a known spatial relationship.

7. The survey instrument of claim 1 wherein an entrance pupil of the imaging device is substantially coaxial with the antenna phase center of the GNSS receiver and the second end of the support pole.

8. A survey instrument, comprising:
a surveying device configured to perform survey measurements;
an imaging device coupled to the surveying device and having a known spatial relationship with the surveying device, the imaging device configured to obtain image information;
a processor in electrical communication with the imaging device, the processor configured to:
receive location information from at least one of the surveying device or the imaging device;
receive the image information from the imaging device;
process the image information to determine a pose of the imaging device;
determine a tilt angle of the survey instrument and a tilt direction of the survey instrument in a reference frame, the tilt angle and the tilt direction of the survey instrument determined using the pose of the imaging device; and
determine a location of a point of interest in the reference frame, the location determined using the location information and the tilt angle and the tilt direction of the survey instrument.

9. The survey instrument of claim 8 wherein the image information includes a first image captured at a first location with a vertical axis of the imaging device substantially parallel to a local gravity vector, and a second image captured at a second location, and wherein the pose of the imaging device is determined based on features in the first image compared to the features in the second image.

10. The survey instrument of claim 8 wherein the image information includes at least one image, and the pose of the imaging device is determined based on features in the image having known locations in the reference frame.

11. The survey instrument of claim 8 wherein the image information includes a plurality of images each capturing features that are common with another one of the plurality of images and at least one of the plurality of images is captured while the imaging device is substantially parallel to a local gravity vector, and the processor is configured to process the image information using correspondences between the plurality of images.

12. The survey instrument of claim 8 wherein the processor is configured to process the image information using a feature-identification process, and the image information includes at least one image capturing features having known locations in the reference frame.

13. The survey instrument of claim 8 wherein the processor is disposed within a handheld device that is separate from the surveying device and the imaging device, and the image information is received from the imaging device using a wireless communications link.

14. The survey instrument of claim 8 wherein the surveying device comprises a global navigation satellite system (GNSS) receiver configured to determine the location information.

15. The survey instrument of claim 8 further comprising a support pole, a first end of the support pole coupled to the surveying device and a second end of the support pole configured to be placed at the point of interest.

16. The survey instrument of claim 8 further comprising a support pole, the imaging device coupled to the support pole and having a known spatial relationship with a tip of the support pole that is configured to be placed at the point of interest, wherein the processor is further configured to process the image information to determine the location information, and configured to determine a location of the tip of the support pole in the reference frame using the location information, the tilt angle and the tilt direction of the survey instrument, and the known spatial relationship between the imaging device and the tip of the support pole.

17. The survey instrument of claim 8 further comprising a support pole, the surveying device coupled to a first end of the support pole and comprising a global navigation satellite system (GNSS) receiver configured to determine the location information, the GNSS receiver having a known spatial relationship with a second end of the support pole, wherein the processor is further configured to determine a location of the second end of the support pole using the location information from the GNSS receiver, the tilt angle and the tilt direction of the survey instrument, and the known spatial relationship between the GNSS receiver and the second end of the support pole.

18. The survey instrument of claim 8 wherein the imaging device and the surveying device are arranged in a known spatial relationship.

19. The survey instrument of claim 8 wherein the survey measurements performed by the surveying device include location measurements corresponding to a measurement center of the surveying device, and an entrance pupil of the imaging device is substantially coaxial with the measurement center of the surveying device and first and second ends of the support pole.

20. The survey instrument of claim 8 wherein the surveying device comprises an optical survey instrument configured to perform optical survey measurements and a distance measuring device configured to determine a distance to the point of interest, the survey instrument further comprising a tripod support coupled to the surveying device and the imaging device.

21. The survey instrument of claim 20 wherein the surveying device comprises a global navigation satellite system (GNSS) receiver configured to determine the location information, and the processor is further configured to determine the location of the point of interest using the location information, the optical survey measurements, the distance, and the tilt angle and the tilt direction of the survey instrument.

22. The survey instrument of claim 8 wherein the surveying device and the imaging device are integrated within a handheld device.

23. The survey instrument of claim 8 wherein the surveying device and the imaging device are integrated within a handheld device, the handheld device comprising a laser pointer for aligning the handheld device with the point of interest and a distance measurement device for determining a distance to the point of interest, wherein the survey measurements performed by the surveying device include determining the location information, and the processor is further configured to determine the location of the point of interest using the location information, the tilt angle and the tilt direction of the survey instrument, and the distance to the point of interest.

24. The survey instrument of claim 23 wherein the distance measurement device determines the distance to the point of interest using sonic measurements.

25. The survey instrument of claim 23 wherein the distance measurement device is an electronic distance measurement (EDM) device.

26. The survey instrument of claim 23 wherein the distance measurement device uses the laser to determine the distance to the point of interest.

27. A method of determining a location of a point of interest using a survey instrument, the method comprising:
receiving a location of an antenna phase center from a global navigation satellite system (GNSS) receiver;
receiving image information from an imaging device;
determining a pose of the imaging device using the image information;
determining a tilt angle of the survey instrument and a tilt direction of the survey instrument in a reference frame, the tilt angle and the tilt direction of the survey instrument determined using the pose of the imaging device; and
determining the location of the point of interest using the location of the antenna phase center and the tilt angle and the tilt direction of the survey instrument.

28. The method of claim 27 wherein the image information includes a plurality of images each capturing features that are common with another one of the plurality of images and at least one of the plurality of images is captured while the imaging device is substantially parallel to a local gravity vector, and wherein determining the pose of the imaging device comprises processing the image information using correspondences between the plurality of images.

29. The method of claim 27 wherein determining the pose of the imaging device comprises processing the image information using a feature-identification process, and the image information includes at least one image capturing features having known locations in the reference frame.

30. The method of claim 27 wherein the imaging device and an antenna phase center of the GNSS receiver are arranged in a known spatial relationship.

31. The method of claim 27 wherein the survey instrument comprises a support pole having a first end coupled to the GNSS receiver and a second end configured to be placed at the point of interest, and wherein an entrance pupil of the imaging device is substantially coaxial with an antenna phase center of the GNSS receiver and the second end of the support pole.

32. The method of claim 27 further comprising:
providing a user indication to obtain additional image information, the user indication activated based on at least one of (1) a distance from a reference measurement station, (2) a number of correspondences between images compared to a threshold, or (3) an error in the pose of the imaging device compared to a threshold.

33. A method of determining a tilt angle and a tilt direction of a survey instrument, the method comprising:
aligning the survey instrument with a local gravity vector at a first station;
acquiring a first image at the first station using an imaging device, the first image capturing a plurality of features;
positioning the survey instrument at a second station different from the first station;
acquiring a second image at the second station using the imaging device, the second image capturing at least a portion of the plurality of features captured in the first image;
processing the first image and the second image to determine a pose of the imaging device at the second station; and
determining the tilt angle and the tilt direction of the survey instrument at the second station, the tilt angle and the tilt direction determined using the pose of the imaging device.

34. The method of claim 33 further comprising:
at the second station, determining a location of the survey instrument in the reference frame; and
determining a location of a point of interest using the tilt angle and the tilt direction of the survey instrument at the second station and the location of the survey instrument at the second station.

35. The method of claim 33 wherein the survey instrument comprises a support pole and a global navigation satellite system (GNSS) receiver, and the GNSS receiver is coupled to a first end of the support pole and the imaging device is positioned substantially coaxial between an antenna phase center of the GNSS receiver and a second end of the support pole.

36. The method of claim 33 wherein the survey instrument is a handheld device that includes the imaging device and a surveying device configured to perform location measurements.

37. The method of claim 33 further comprising: providing a user indication that the tilt angle at the second station is greater than a threshold tilt angle.

* * * * *